United States Patent
McDonald et al.

[11] Patent Number: 5,331,942
[45] Date of Patent: Jul. 26, 1994

[54] FUEL SUPPORT GRILL RACK

[75] Inventors: Ross McDonald, Leabrook; Alan Royce, Adelaide, both of Australia; James C. Stephen, Arlington Heights, Ill.

[73] Assignee: Weber-Stephen Products Co., Palatine, Ill.

[21] Appl. No.: 930,067

[22] Filed: Aug. 14, 1992

[51] Int. Cl.$^5$ .................. A47J 37/00; F24B 3/00
[52] U.S. Cl. .................. 126/25 R; 126/25 B; 126/152 B; 211/181
[58] Field of Search ............ 126/25 R, 25 A, 25 B, 126/41 R, 152 R, 152 B, 152 A, 9 R, 9 B, 540–543; 99/450, 445, 482; 211/40, 181

[56] References Cited

U.S. PATENT DOCUMENTS

| | | | |
|---|---|---|---|
| Re. 32,288 | 11/1986 | Berger | 99/450 |
| 1,133,850 | 3/1915 | Garraux | 99/445 |
| 1,504,102 | 8/1924 | Davis | 99/445 |
| 2,205,064 | 6/1940 | Irwin | 211/40 |
| 2,918,051 | 12/1959 | Broman | 126/25 R |
| 2,940,381 | 6/1960 | Cottongim et al. | 126/25 R |
| 3,060,919 | 10/1962 | Shaw | 126/25 C |
| 3,164,108 | 1/1965 | Romero | 211/181 |
| 3,424,145 | 1/1969 | Stitt | 126/152 R |
| 3,443,510 | 5/1969 | Norton | 126/25 R |
| 3,552,301 | 1/1971 | McNeff | 126/25 R |
| 3,688,758 | 9/1972 | Stephen, Jr. | 126/41 R |
| 3,859,978 | 1/1975 | Smith | 126/25 A |
| 3,989,028 | 11/1976 | Berger | 126/41 R |
| 4,190,677 | 2/1980 | Robins | 99/482 |
| 4,233,890 | 11/1980 | Jansen | 126/25 R |
| 4,567,876 | 2/1986 | Ogden | 126/25 B |
| 4,583,452 | 4/1986 | Grosse | 99/450 |
| 4,606,261 | 8/1986 | Bernardi | 99/445 |
| 4,697,506 | 10/1987 | Ducate, Jr. | 126/41 R |
| 4,727,853 | 3/1988 | Stephen et al. | 126/41 R |
| 4,777,927 | 10/1988 | Stephen et al. | 126/25 R |
| 5,044,266 | 9/1991 | Geogaris | 99/446 |

FOREIGN PATENT DOCUMENTS

| | | | |
|---|---|---|---|
| 149728 | 7/1986 | Japan | 126/25 B |
| 197807 | 7/1978 | Switzerland | 126/25 R |

Primary Examiner—James C. Yeung
Attorney, Agent, or Firm—Wallenstein, Wagner & Hattis, Ltd.

[57] ABSTRACT

A fuel support grill rack (10) for use in a barbecue grill (11) is disclosed. The grill rack (10) is positioned below a cooking grid. The grill rack (10) includes a substantially horizontal first surface (20) for supporting charcoal and a second surface (21) comprised of a pair of troughs (30a, 30b) formed by at least two trough walls (31) angularly depending downwardly from the first surface (20). Each trough (30a, 30b) further includes a first end trough (32), a second end trough (33), and an inner trough (34) disposed therebetween. The inner trough (34) is deeper and extends below the first and second end troughs (32, 33). The apices (35, 36) of the first end trough and the second end trough are positioned above an apex (37) of the inner trough (34).

8 Claims, 2 Drawing Sheets

FUEL SUPPORT GRILL RACK

DESCRIPTION

1. Technical Field

The present invention relates generally to barbecue grills, and more particularly, to a fuel support grill rack that can be easily used with such grills and that can hold a combustion source in the form of solid fuel cubes below the charcoal briquettes.

2. Background Prior Art

Barbecue grills are very widely used today. Presently, one of the most popular grills, a kettle-type grill, is being marketed by the Assignee of the present invention, Weber-Stephen Products Co. This barbecue kettle consists of a generally semi-spherical bottom bowl that has a circular open top with a cooking grill rack slightly below the upper rim of the bowl. A generally semi-ellipsoid top cover can be placed on the bottom bowl. The barbecue grill is generally constructed in accordance with the teachings of U.S. Pat. No. Re. 33,091, owned by the Assignee of the present invention. The grill can be supported by a tripod leg arrangement of the type disclosed in U.S. Pat. No. 3,538,906. The kettle configuration with and without the legs are registered trademarks of the Assignee of the present invention. The kettle can also be supported on various carts, such as those disclosed in U.S. Pat. Nos. 5,027,788 and 5,076,252, also owned by Weber-Stephen Products Co.

Barbecue kettles that are designed for burning fuel, such as charcoal, can also have a second grill rack for supporting the charcoal, which is spaced below and parallel to the cooking surface. Both the bowl and the cover have vent openings for permitting the entrance of oxygen for combustion of the charcoal while the cover is closed. Typically, the grill racks for supporting charcoal have only a single horizontal surface. An individual cooking on the grill places the items to be cooked on the cooking grill rack or grid and the charcoal briquettes on the second grill rack or grid. When using a combustion source, such as a solid fuel cube, to start the charcoal, it can often be difficult to place and ignite the combustion source among the charcoal and in close proximity with the food. Also, if a solid fuel cube combustion source is placed on a single surface grill rack, only a single face of the cube is exposed uppermost to the charcoal. Thus, lighting the cube and starting the charcoal prove more difficult, since the face of a cube does not light as quickly as an edge of a cube, exposing a minimum amount of surface area of the cube directly to the charcoal.

The present invention overcomes the above-mentioned problems by providing a fuel support grill having two surfaces. A first surface is designed to primarily support or hold charcoal briquettes used alone or placed in charcoal baskets. Highly successful charcoal baskets are disclosed in U.S. Pat. No. 4,777,927 assigned to Weber-Stephen Products Co. and sold under the trademark CHAR-BASKETS TM fuel holders. A second surface is designed to primarily support or hold one or more solid combustion sources, i.e., solid fuel cubes like the ones sold by Weber-Stephen Products Co., under the trademarks FLAMGO ® FIRESTARTERS and FLAMGO ® CUBE.

SUMMARY OF THE INVENTION

According to the primary aspect of the present invention, a fuel support grill rack is disclosed having two surfaces. A first surface is structured to primarily support charcoal either alone or placed in charcoal baskets, and a second surface is structured to primarily support one or more solid combustion sources for use in starting the charcoal for barbecue grilling. The fuel support grill rack can be positioned in the bottom bowl of a barbecue grill and spaced below a cooking grill rack.

The grill rack includes a substantially horizontal first surface and a second surface integral with and below the first surface. The first and second surfaces are comprised of a plurality of spaced, parallel grid rods connected to a perimeter member adjacent the ends of the grid rods. The second surface is formed by bending some of the grid rods to format least one trough, which is preferably positioned in the middle of the fuel support grill rack. However, a plurality of troughs can be employed. The troughs are formed by at least two walls angularly depending downwardly from the first surface. Providing for a fuel support grill rack design with a second surface in the form of a trough allows a user to easily place and secure a solid cube combustion source in the trough below the charcoal. For added strength, the grill rack also includes a grid rod extending along a center diameter of the grill rack.

According to another aspect of the invention, the two walls angularly depending downwardly from the first surface forming the trough converge in such a manner so as to form a generally V-shaped configuration.

According to yet another aspect of the invention, the troughs may include end troughs to act as bumpers or stops at each end of the trough. The end troughs can also be formed by at least two walls angularly depending downwardly from the first surface, and the walls of the end troughs converge at apices positioned above an apex formed by the walls of the trough disposed therebetween.

Other advantages and aspects of the present invention will become apparent upon reading the following description of the drawings and the detailed description of the invention and preferred embodiment of the invention.

BRIEF DESCRIPTION OF DRAWINGS

In order that the present invention may be more fully understood, it will now be described by way of example, with reference to the accompanying drawings in which.

DETAILED DESCRIPTION OF A PREFERRED EMBODIMENT

The present invention is susceptible of embodiments in several forms. The drawings show and the specification describes in detail a preferred embodiment of the invention. It is to be understood that the present disclosure is to be considered as an exemplification of the principles of the invention. It is not intended to limit the broad aspects of the invention to the illustrated embodiment.

Figure 1:
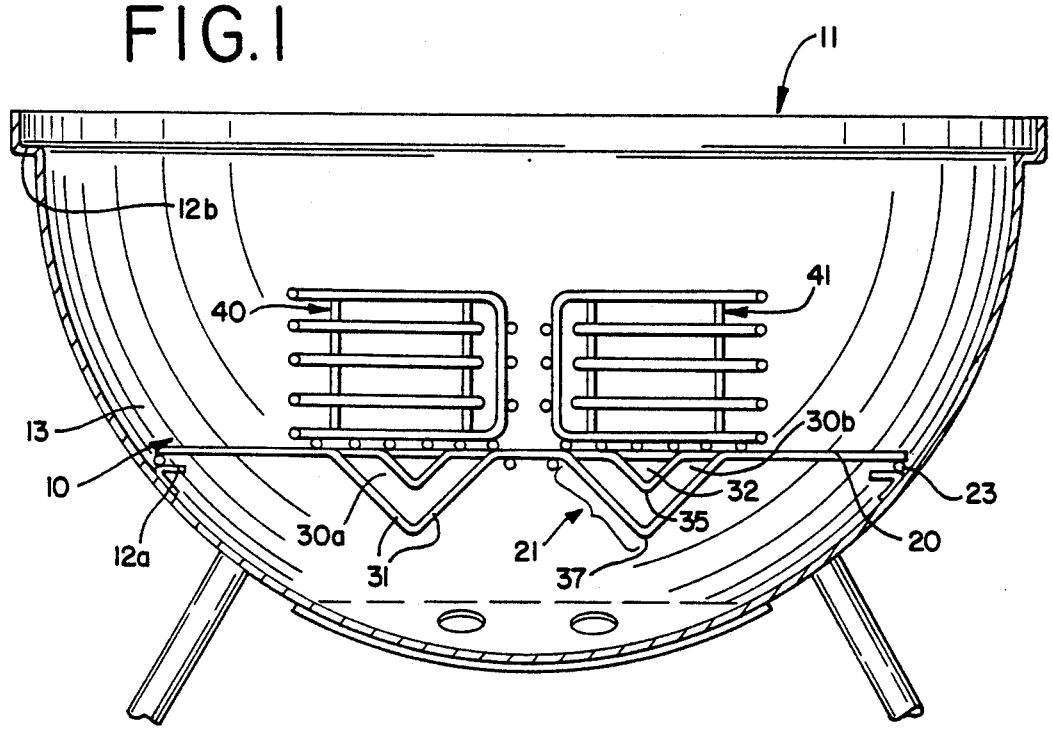
FIG. 1 is a side view of a barbecue grill showing the fuel support grill rack made in accordance with the teachings of the present invention and also showing two charcoal baskets resting on the top surface of the fuel support grill rack.

FIG. 1 of the drawings shows a barbecue grill, generally designated by the reference numeral (11), that is of a well-known configuration and has been sold by the Assignee of the present invention, Weber-Stephen Products Co., for more than 30 years. The barbecue grill is generally constructed in accordance with the teachings of U.S. Pat. No. Re. 33,091, owned by the Assignee of the present invention, and the grill is supported by a tripod leg arrangement of the type disclosed in U.S. Pat. No. 3,538,906, or by a cart, U.S. Pat. Nos. 5,027,788 and 5,076,252, all patents being incorporated herein by reference.

As shown in FIG. 1, the fuel support grill rack (10) of the present invention is supported on a first ledge (12a) in the bottom bowl (13) of the barbecue grill (11). Or, due to the decreasing diameter of the bottom bowl (13), the rack (10) can be supported on the inside surface alone of the bottom bowl (13). The fuel support grill rack (10) is typically positioned below a standard cooking grill rack or cooking grid (not shown) supported on a second ledge (12b). A pair of charcoal baskets (40, 41) are positionable on the grill rack (10) for direct or indirect cooking. Highly successful charcoal baskets are disclosed in U.S. Pat. No. 4,777,927 assigned to Weber-Stephen Products Co. and sold under the trademark CHAR-BASKETS TM fuel holders, and incorporated herein by reference. The grill rack (10) includes a substantially horizontal first surface (20) and a second surface (21) integral with and positioned below the first surface (20). The first surface (20) and the second surface (21) are comprised of a plurality of spaced, parallel grid rods (22) preferably connected by conventional means, such as by welding, to a perimeter member (24) adjacent the ends (23) of the grid rods (22). The second surface (21) is formed by bending some of the grid rods (22) into a trough configuration. This second surface (21) can be in the form of one first trough (30a) or two parallel, yet spaced apart first and second troughs (30a,30b) positioned in the middle of the fuel support grill rack (10). Each trough is formed by at least two trough walls (31) angularly depending downwardly from the first surface (20). In the preferred embodiment, the two trough walls (31) angularly depend downwardly from the first surface (20) to form a generally V-shaped configuration.

Figure 2:
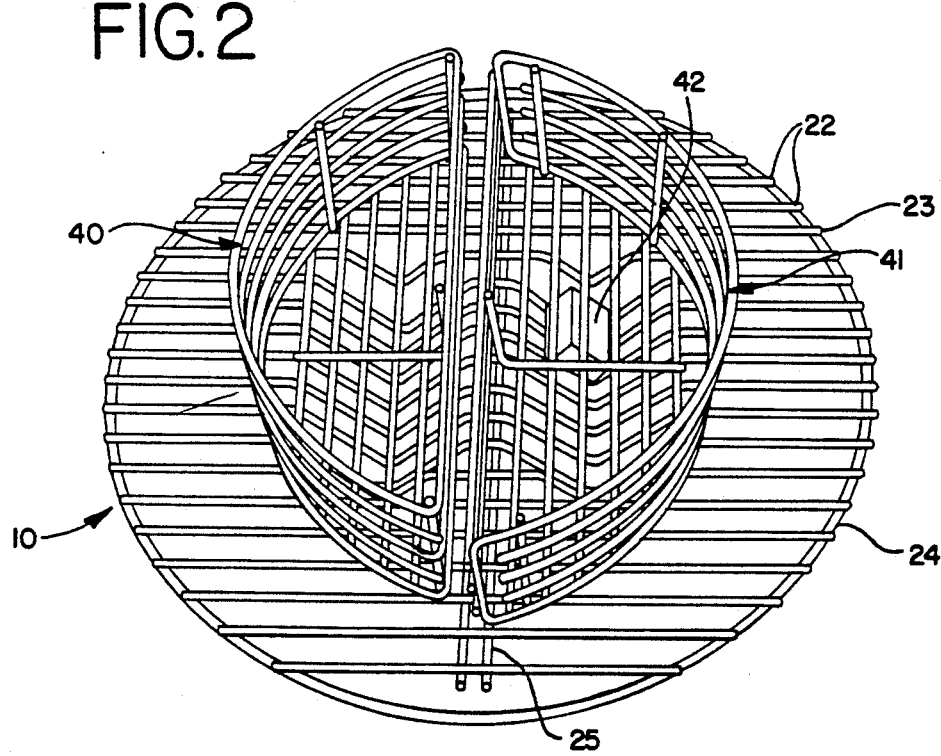
FIG. 2 is a top view of the fuel support grill rack of FIG. 1 with two charcoal baskets and a solid fuel cube resting thereon.

As shown in FIG. 2, the fuel support grill rack (10) has a plurality of grid rods (22) that can support charcoal briquettes either alone or placed in charcoal baskets (40,41). The fuel support grill rack (10) is also designed to support a solid combustion source (42), i.e., solid fuel cubes like the ones sold by the Assignee of the present invention, Weber-Stephen Products Co., under the trademarks FLAMGO ® FIRESTARTERS and FLAMGO ® CUBE. These solid fuel cubes are designed to light steadily, easily and safely, and the cubes are odorless, smokeless and nontoxic. The solid fuel cubes are placed in the troughs and preferably placed below the charcoal on the rack or in baskets so as to effectively ignite the charcoal. The charcoal can also be piled around and on top of the burning cubes. Since an edge of the cube is presented at the uppermost part of the trough, the cube can be lit quickly and easily and the charcoal can be ignited more quickly.

Providing for a fuel support grill rack design with V-shaped troughs (30a,30b) allows a user to easily place and secure a solid cube combustion source (42) in the trough below the charcoal (not shown).

There are several additional advantages to forming the trough or troughs into a generally V-shaped configuration. First, when the solid fuel cube is placed into the V-shaped trough, an edge of the cube is presented upwardly and at the uppermost point in the trough. The edges of a cube light more quickly and easily than the faces of the cube, and thus, when the edges of the cube are pointed upward or downward, the edges can be easily located and ignited by a match or lighter quickly and efficiently. In addition, when the cube is placed into the V-shaped trough, two faces of the cube are upwardly exposed to the charcoal, as opposed to only one face of the cube being upwardly exposed if the grill rack surface were flat. Thus, the solid fuel cube has more surface area providing a flame to the charcoal, allowing more charcoal to be started and decreasing the time it takes to prepare the barbecue grill. Finally, the V-shaped configuration of the troughs allows the grill racks to be easily and efficiently stacked upon each other during the manufacturing process, transportation and storage.

While the embodiment shown has V-shaped troughs, it is appreciated that the troughs can also be rectangular, semi-circular, trapezoidal and other geometric configurations.

Figure 3:
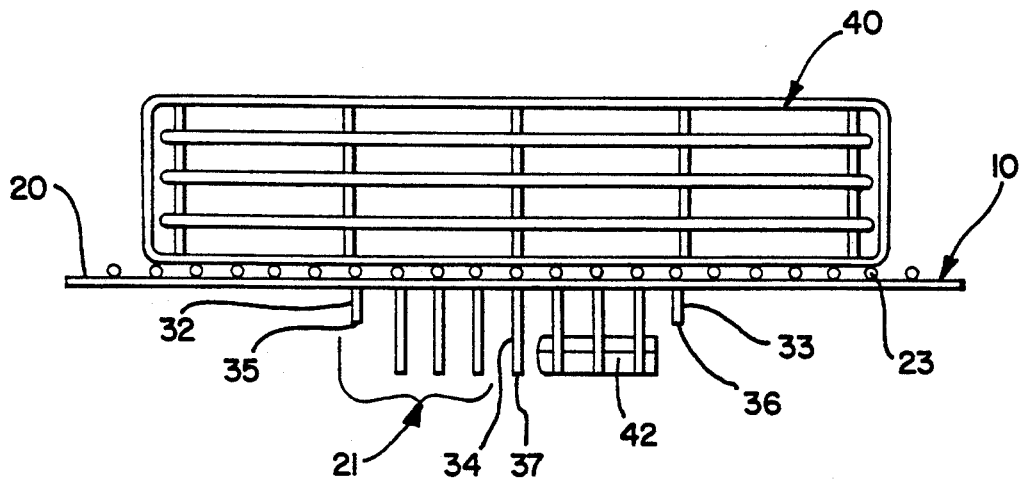
FIG. 3 is a side elevational view of the fuel support grill rack, charcoal baskets and solid fuel cube of FIG. 2; and, FIG. 4 is a perspective top view of a preferred embodiment of the present invention showing the fuel support grill rack alone.

As shown in FIG. 3, in order to prevent the solid fuel cube from sliding out of the trough and under the grid supporting the charcoal, the second surface comprises a first end trough (32), a second end trough (33), and at least one inner trough (34) disposed therebetween. The troughs have at least two trough walls (31) angularly depending downwardly from the first surface (20). The trough walls (31) converge at apices. The apex (35) of the first end trough (32) and the apex (36) of the second end trough (33) are positioned above and at a higher level than the apex (37) of the inner trough (34). Thus, the inner trough (34) is deeper and extends below the first and second end troughs (32,33). As noted, this structural arrangement has the advantages of preventing the solid fuel cube or cubes from sliding off the sides of the grill rack or from falling through the grid rods to the bottom of the barbecue grill, since the first end trough and second end trough act as bumpers or stops to retain the solid fuel cubes in the inner trough (34).

Figure 4:
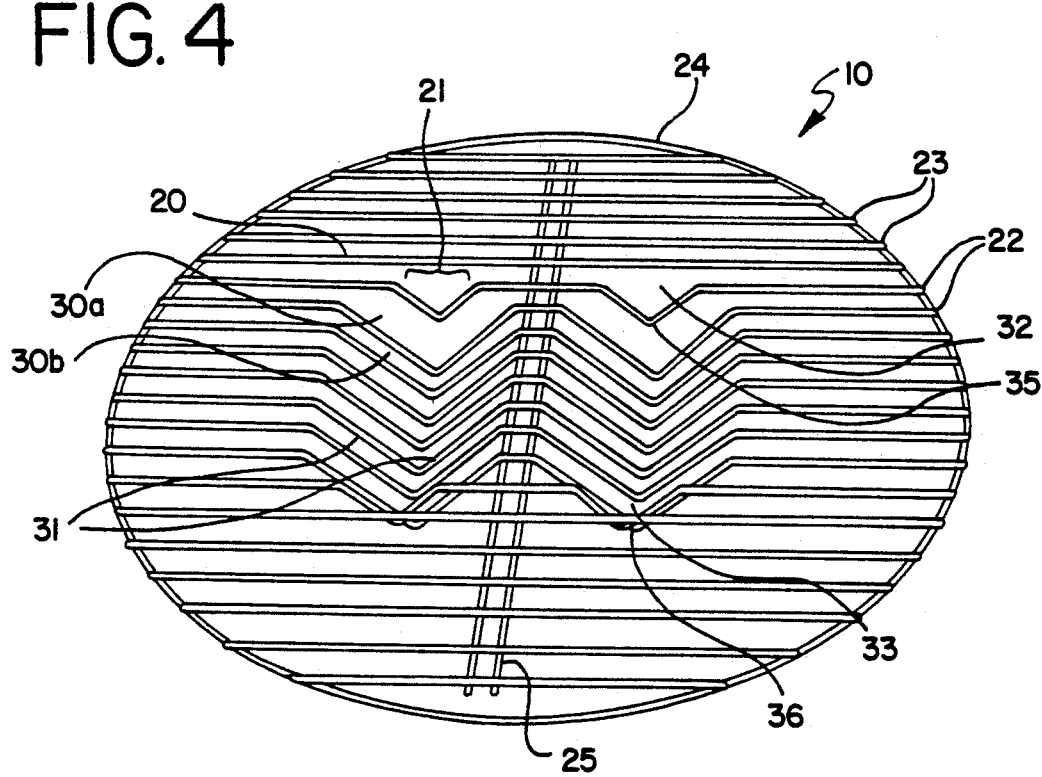

Shown in FIG. 4, the spaced, parallel grid rods (22) are connected to a perimeter member (24) adjacent the ends (23) of the grid rods. For additional structural support, the grill rack (10) also includes at least one grid rod (25) extending along a center diameter of the grill rack (10). The grid rod (25) is attached, such as by welding, below and perpendicular to the parallel, spaced grid rods (22) of the first surface (20) and second surface (21). The preferred embodiment shows a fuel support grill rack (10) having two grid rods (25) parallel to each other and opposite each other along the imaginary center diameter of the grill rack (10).

While the specific embodiments have been illustrated and described, numerous modifications come to mind without significantly departing from the spirit of the invention and the scope of protection is only limited by the scope of the accompanying claims.

We claim:

1. A fuel support element for use with a barbecue grill comprising:

a substantially horizontal first surface;

a first trough having at least two walls angularly depending downwardly from said first surface and positioned below said first surface; and, a second trough parallel to said first trough, said second trough including at least two walls angularly depending downwardly from said first surface so as to form a generally V-shaped configuration, said first and second troughs being spaced apart with a substantially horizontal intermediate surface being disposed between said troughs.

2. A fuel support element for use with a barbecue grill comprising:

a substantially horizontal first surface;

a first trough having at least two walls angularly depending downwardly from said first surface and positioned below said first surface; and, a second trough parallel to said first trough, said second trough including at least two walls angularly depending downwardly from said first surface, each said trough including a first end trough, a second end trough, and at least one inner trough disposed therebetween, said troughs having at least two walls angularly depending downwardly from said first surface, said walls of said first end trough and said walls of said second end trough converging at apices positioned above an apex formed by said converging walls of said inner trough.

3. A fuel support element for supporting charcoal in a barbecue grill comprising:

a substantially planar charcoal support surface;

a first trough integral with and extending below said charcoal support surface and including at least two walls angularly depending downwardly from said support surface; and, a second trough having at least two walls angularly depending downwardly from said support surface so as to form a generally V-shaped configuration, said first and second trough being spaced apart with a substantially horizontal intermediate surface being disposed between said troughs.

4. The fuel support element as defined in claim 3 wherein each said trough includes a first end trough, a second end trough, and at least one inner trough disposed therebetween, said troughs having at least two walls angularly depending downwardly from said first surface, said walls of said first end trough and said walls of said second end trough converging at apices positioned above an apex formed by said converging walls of said inner trough.

5. A fuel support grill rack for use with a barbecue grill having a bottom bowl with a base comprising:

a plurality of spaced, parallel and substantially horizontal grill rods attached to a perimeter member adjacent the ends thereof, said grill rods positioned in a middle portion of the rack and being bent to form a plurality of troughs, each said trough having walls extending downwardly in a generally V-shaped configuration and being spaced above the base of the bottom bowl, said troughs being spaced apart with a substantially horizontal surface formed of parallel grill rods between each pair of said troughs.

6. The fuel support grill rack as defined in claim 5 wherein said grill rods are spaced apart so as to hold charcoal briquettes.

7. The fuel support grill rack as defined in claim 5 wherein each said trough includes a V-shaped first end trough, a V-shaped second end trough, and at least one V-shaped inner trough disposed therebetween, an apex of said first end trough and an apex of said second end trough being positioned above an apex of said inner trough.

8. A fuel support member for use with a barbecue grill comprising:

a substantially planar horizontal first surface having a plurality of spaced, parallel grid rods connected to a perimeter member adjacent the ends thereof; and, a second surface positioned below said first surface and having a plurality of spaced, parallel grid rods connected to a perimeter member adjacent the ends thereof, said second surface including a first end trough, a second end trough, and at least one inner trough disposed therebetween, said troughs including at least two walls depending downwardly from said first surface, said walls of said first end trough and said walls of said second end trough converging at apices positioned above an apex formed by said converging walls of said inner trough.

* * * * *